US009686579B2

United States Patent
Majid

(10) Patent No.: US 9,686,579 B2
(45) Date of Patent: *Jun. 20, 2017

(54) TELEVISION TUNER DEVICE FOR PROCESSING DIGITAL AUDIOVISUAL CONTENT

(71) Applicant: BBY SOLUTIONS, INC., Richfield, MN (US)

(72) Inventor: Mahmood Majid, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,385

(22) Filed: Aug. 9, 2016

(65) Prior Publication Data

US 2016/0353152 A1    Dec. 1, 2016

Related U.S. Application Data

(63) Continuation of application No. 14/519,968, filed on Oct. 21, 2014, now Pat. No. 9,420,214.

(51) Int. Cl.
*H04N 21/426* (2011.01)
*H04N 5/50* (2006.01)
(Continued)

(52) U.S. Cl.
CPC ........... *H04N 21/4263* (2013.01); *H04N 5/50* (2013.01); *H04N 21/4183* (2013.01);
(Continued)

(58) Field of Classification Search
USPC .......................................... 348/731, 732, 730
See application file for complete search history.

(56) References Cited

U.S. PATENT DOCUMENTS

| 3,913,038 A | 10/1975 | Carter et al. |
| 8,522,283 B2 | 8/2013 | Laligand et al. |

(Continued)

OTHER PUBLICATIONS

"Aereo Out of Thin Air", [online]. The Wall Street Journal. [retrieved on Dec. 30, 2014]. Retrieved from the Internet: <URL: http://www.extremetech.com/computing/185242-us-supreme-court-decides-against-aereo-eviscerates-the-companys-business-model>, (2014), 1 pg.

(Continued)

*Primary Examiner* — Paulos M Natnael
(74) *Attorney, Agent, or Firm* — Schwegman Lundberg & Woessner, P.A.

(57) ABSTRACT

Embodiments of a device for receiving a digital terrestrial, cable, or satellite television signal are described herein. For example, a silicon tuner module may be configured to receive a digital terrestrial, cable, or satellite television signal and output a digital bitstream, the digital bitstream may include audio visual content in an encoded transport stream. In a further example, a digital audio video connector may be configured to couple with a display device, the digital audio video connector may be configured to provide the digital bitstream to the display device according to a specification. In another example, a processing module may be configured to control the silicon tuner module in response to a Consumer Electronics Control command received from the display device via the digital audio video connector.

22 Claims, 6 Drawing Sheets

(51) Int. Cl.
*H04N 21/418* (2011.01)
*H04N 21/4363* (2011.01)
*H04N 21/438* (2011.01)
*H04N 21/422* (2011.01)
*H04N 21/6379* (2011.01)

(52) U.S. Cl.
CPC ....... *H04N 21/422* (2013.01); *H04N 21/4382* (2013.01); *H04N 21/4383* (2013.01); *H04N 21/43632* (2013.01); *H04N 21/43635* (2013.01); *H04N 21/43637* (2013.01); *H04N 21/6379* (2013.01)

(56) References Cited

U.S. PATENT DOCUMENTS

| | | | |
|---|---|---|---|
| 9,420,214 | B2 | 8/2016 | Majid |
| 2003/0200548 | A1* | 10/2003 | Baran ............... H04L 29/06027 725/90 |
| 2004/0266376 | A1 | 12/2004 | Cowley et al. |
| 2005/0105007 | A1* | 5/2005 | Christian ................. H04N 5/46 348/731 |
| 2006/0050184 | A1* | 3/2006 | McMiller ............. H04N 5/4401 348/725 |
| 2006/0051071 | A1 | 3/2006 | Poo |
| 2006/0133773 | A1 | 6/2006 | Ohmura et al. |
| 2007/0242165 | A1* | 10/2007 | Naito ..................... H03J 1/0083 348/731 |
| 2007/0250872 | A1 | 10/2007 | Dua |
| 2007/0291180 | A1 | 12/2007 | Takatori |
| 2009/0199256 | A1 | 8/2009 | White et al. |
| 2009/0256963 | A1 | 10/2009 | Sato |
| 2010/0011397 | A1 | 1/2010 | Baran et al. |
| 2010/0053463 | A1* | 3/2010 | Yeh .................. H04N 21/43615 348/734 |
| 2010/0060784 | A1 | 3/2010 | Ansari |
| 2010/0110307 | A1 | 5/2010 | Leme et al. |
| 2011/0205445 | A1 | 8/2011 | Lee et al. |
| 2011/0242428 | A1 | 10/2011 | Blouin et al. |
| 2012/0003863 | A1 | 1/2012 | Sung et al. |
| 2012/0249234 | A1 | 10/2012 | Robert et al. |
| 2012/0260291 | A1 | 10/2012 | Wood |
| 2012/0314139 | A1 | 12/2012 | Siegel |
| 2013/0111521 | A1* | 5/2013 | Klarke ............... H04N 21/4221 725/38 |
| 2013/0111537 | A1 | 5/2013 | Klarke et al. |
| 2013/0141331 | A1 | 6/2013 | Shiu et al. |
| 2013/0155333 | A1 | 6/2013 | Koizumi |
| 2013/0260828 | A1 | 10/2013 | Kim |
| 2013/0335196 | A1 | 12/2013 | Zhang et al. |
| 2013/0346776 | A1 | 12/2013 | Wang et al. |
| 2014/0049697 | A1* | 2/2014 | Sung .................... H04N 5/4403 348/734 |
| 2014/0198418 | A1 | 7/2014 | Wang et al. |
| 2014/0282699 | A1 | 9/2014 | Fertig et al. |
| 2014/0285723 | A1 | 9/2014 | Yang |
| 2014/0300821 | A1 | 10/2014 | Yang |
| 2014/0300824 | A1 | 10/2014 | Yang |
| 2014/0347564 | A1 | 11/2014 | Yang |
| 2014/0368743 | A1 | 12/2014 | Yang |
| 2014/0375895 | A1 | 12/2014 | Haruki et al. |
| 2015/0015078 | A1* | 1/2015 | Kim ................... H03K 19/0175 307/103 |
| 2015/0052574 | A1 | 2/2015 | Yang |
| 2015/0208026 | A1* | 7/2015 | Lai ..................... H04N 21/4183 348/441 |
| 2016/0112670 | A1 | 4/2016 | Majid |

OTHER PUBLICATIONS

"Amazon Fire TV—Streaming Media Player", [online]. [retrieved on Jun. 30, 2014]. Retrieved from the Internet: <URL: http://www.amazon.com/Fire-streaming-media-player/dp/B00CX5P8FC>, (2014), 5 pgs.

"U.S. Appl. No. 14/519,968, Examiner Interview Summary mailed Jan. 29, 2016", 3 pgs.
"U.S. Appl. No. 14/519,968, Non Final Office Action mailed Oct. 15, 2015", 14 pgs.
"U.S. Appl. No. 14/519,968, Notice of Allowance mailed Apr. 13, 2016", 6 pgs.
"U.S. Appl. No. 14/519,968, Response filed Jan. 21, 2016 to Non Final Office Action mailed Oct. 22, 2015", 16 pgs.
"U.S. Appl. No. 14/519,968, Supplemental Notice of Allowability mailed Apr. 29, 2016", 2 pgs.
"U.S. Appl. No. 14/519,997, Examiner Interview Summary mailed Feb. 1, 2016", 3 pgs.
"U.S. Appl. No. 14/519,997, Non Final Office Action mailed Oct. 26, 2015", 14 pgs.
"U.S. Appl. No. 14/519,997, Response filed Jan. 25, 2016 to Non Final Office Action mailed Oct. 26, 2015", 15 pgs.
"Boxee Support—New Web Application version 1.1", [online]. [retrieved on Jun. 30, 2014]. Retrieved from the Internet: <URL: http://support.boxee.tv/home>, (2014), 2 pgs.
"Chromecast", [online]. (c) 2014 Goggle. [retrieved on Jun. 30, 2014]. Retrieved from the Internet: <URL: https://play.goggle.com/store/devices/details?id=chromecast>, 4 pgs.
"Hauppauge Computer Works: WinTV-HVR-950Q Product Description", [online]. (c) 2014 Hauppauge Computer Works, Inc. [retrieved on Jun. 30, 2014]. Retrieved from the Internet: <URL: http://www.hauppauge.com/site/products/data_hvr950q.html>, (2014), 2 pgs.
"How Tablo Works", [online]. (c) 2014 Nuvyyo Inc. [retrieved on Jun. 30, 2014], Retrieved from the Internet: <URL: http://www.tablotv.com/how-tablo-works>, (2014), 4 pgs.
"KWorld UB435-Q Video Device—Newegg.com", [online]. [retrieved on Jun. 30, 2014]. Retrieved from the Internet: <URL: http://www.newegg.com/Product/Product.aspx?gclid=CjgKEAjwq_qcBRDZ-PeZ7NGQiVwSJAATT7q2r2dtpvQE5wL2d3Z3id687OUloepn-ZGDgsYWmOeTbVvD_BwE&Item=N82E16815260023&nm_mc=KNC-GoogleAdwords&c, (2014), 3 pgs.
"Leaf(r) Metro Indoor HDTV Antenna", [online]. (c) 2014 Mohu. [retrieved on Jun. 30, 2014]. Retrieved from the Internet: <URL: http://www.gomohu.com/shop/leaf-metro-indoor-hdtv-antenna.html>, (2014), 3 pgs.
"NeoTV Prime with Google TVtm", [online]. (c) 2012 Netgear, Inc. [retrieved on Jun. 30, 2014], Retrieved from the Internet: <URL: http://www.netgear.com/landing/stream/tv/#googletv>, (2012), 2 pgs.
"Roku Streaming Stick", [online]. [retrieved on Jun. 30, 2014]. Retrieved from the Internet: <http://www.roku.com/products/streaming-stick>, (2014), 4 pgs.
"Roku Streaming Stick (Roku Ready Version)", [online]. [retrieved on Jun. 30, 2014]. Retrieved from the Internet: <URL: https://www.roku.com/products/roku-ready-streaming-stick>, (2014), 2 pgs.
"Simple.TV with Roku", [online}, [retrieved on Jun. 30, 2014]. Retrieved from the Internet: <URL: https://us.simple.tv/roku, (2014), 1 pg.
"Sony Internet Player with Google TV", [online]. (c) 2014 Sony Electronics Inc. [retrieved on Jun. 30, 2014]. Retrieved from the Internet: <URL: http://store.sony.com/internet-player-with-google-tv-zid27-NSZGS8/cat-27-catid-All-Internet-Players>, 4 pgs.
"TiVo Roamio tm", [online]. [retrieved on Jun. 30, 2014]. Retrieved from the Internet: <URL: https://www.tivo/com/shop/roamio>, (2014), 3 pgs.
"Vizio Co-Star Stream Players", [online]. (c) 2014 Vizio, Inc. [retrieved on Jun. 30, 2014]. [retrieved from the Internet: <URL: http://store.vizio.com/co-star>, (2014), 5 pgs.
"Welcome to Simple.TV", [online]. [retrieved on Jun. 30, 2014]. Retrieved from the Internet: <URL: http://us.simple.tv/>, (2014), 3 pgs.
"Western Digital WD TV Live", [online], (c) 2001-2014 Western Digital Technologies, [retrieved on Jun. 30, 2014]. Retrieved from the Internet: <URL: http://www.wdc.com/en/products/products.aspx?id=330#tab2>, (2014), 4 pgs.
"Wiflow TV Can Deliver ATSC Signal to Mobile", [online]. (c) 2013, NewsCheckMedia LLC [archived on Oct. 26, 2013]. Retrieved from the Internet: <URL: https://web.archive.org/web/

(56) References Cited

OTHER PUBLICATIONS

20131026062709/http://www.tvnewscheck.com/playout/2013/05/wiflow-tv-can-deliver-atsc-signal-to-mobile/>, (May 30, 2013), 3 pgs.

Chee, Melissa, et al., "Changing the paradigm for TV silicon tuners", [online}. (c) 2014 UBM Electronics. EE Times. Retrieved from the Internet: <URL: http://www.eetimes.com/document.asp?doc_id=1279583&print=yes, (Apr. 24, 2012), 4 pgs.

Freescale Semiconductor, "Course Introduction, Freescale Silicon Tuner Technical Training", (2004), 34 pgs.

Gilbert, Ben, "Voxx combining broadcast TV with Roku in Q4 2013, working with RCA and Terk", [online]. [retrieved on Jun. 30, 2014]. Retrieved from the Internet: <URL: http://www.engadget.com/2013/01/07/voxx-roku-streaming-stick-broadcast-tv>, (2013), 5 pgs.

Sony Corporation, "CMOS Silicon Tuners for Large-Screen TV Sets", (2009), 4 pgs.

\* cited by examiner

TELEVISION TUNER DEVICE FOR PROCESSING DIGITAL AUDIOVISUAL CONTENT

RELATED APPLICATIONS

This application is a continuation of U.S. patent application Ser. No. 14/519,968, filed Oct. 21, 2014, which is related to U.S. patent application Ser. No. 14/519,997, filed on Oct. 21, 2014, titled MULTISTREAM TUNER STICK DEVICE FOR RECEIVING AND STREAMING DIGITAL CONTENT, which applications are incorporated by reference in their entirety.

TECHNICAL FIELD

Embodiments pertain to television tuner devices. Some embodiments relate to consumer electronic display devices, such as televisions, monitors, and the like.

BACKGROUND

Electronic display devices such as televisions, monitors, video receivers, and projectors often contain internal television tuners for receipt of digital terrestrial, cable, or satellite television signals. Increasingly, consumers are using electronic display devices to access video content without using a television tuner. The cost added by internal tuners to electronic display devices, therefore, is undesirable when many consumers do not use them.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Traditionally, in the United States, television broadcasts were done using an analog National Television System Committee (NTSC) signal. In 2009, standards throughout the United States were changed to an Advanced Television Systems Committee (ATSC) digital terrestrial television signal, also known as an over-the-air digital television signal. Other countries use other various digital signal standards to send digital terrestrial television signals, such as Digital Video Broadcasting-Terrestrial (DVB-T) standard throughout Europe and most of Asia, Integrated Services Digital Broadcasting-Terrestrial (ISDB-T) standard in most of South America, and Digital Terrestrial Multimedia Broadcast (DTMB) standard in China. Cable television in the United States is typically broadcast using a quadrature amplitude modulation (QAM) format. Each of these examples of digital television signals may be used with a tuner device provided that the tuner device is configured to interpret the type of signal received.

Some of the embodiments described herein describe a tuner device used for the display of audio visual content at an electronic display device. With existing display devices such as televisions and monitors, a tuner is either built in to the device, such as in the case of televisions, or an external tuner device is used, such as in the case of monitors. There is a cost added by internal tuners to electronic display devices that is unnecessary if a consumer does not ever use the tuner device. In the case of monitors, the external tuner devices currently used are large and cumbersome and take up space on shelves, floors, or in media cabinets. In another approach, a consumer must use a computer with a special television tuner card to view content on a display device. This approach often requires installing software or installing hardware inside a personal computer, which is complicated and requires some technical expertise to do. All of these current approaches lack a single, unobtrusive, simple to install, easily removable, low cost solution.

Figure 1:
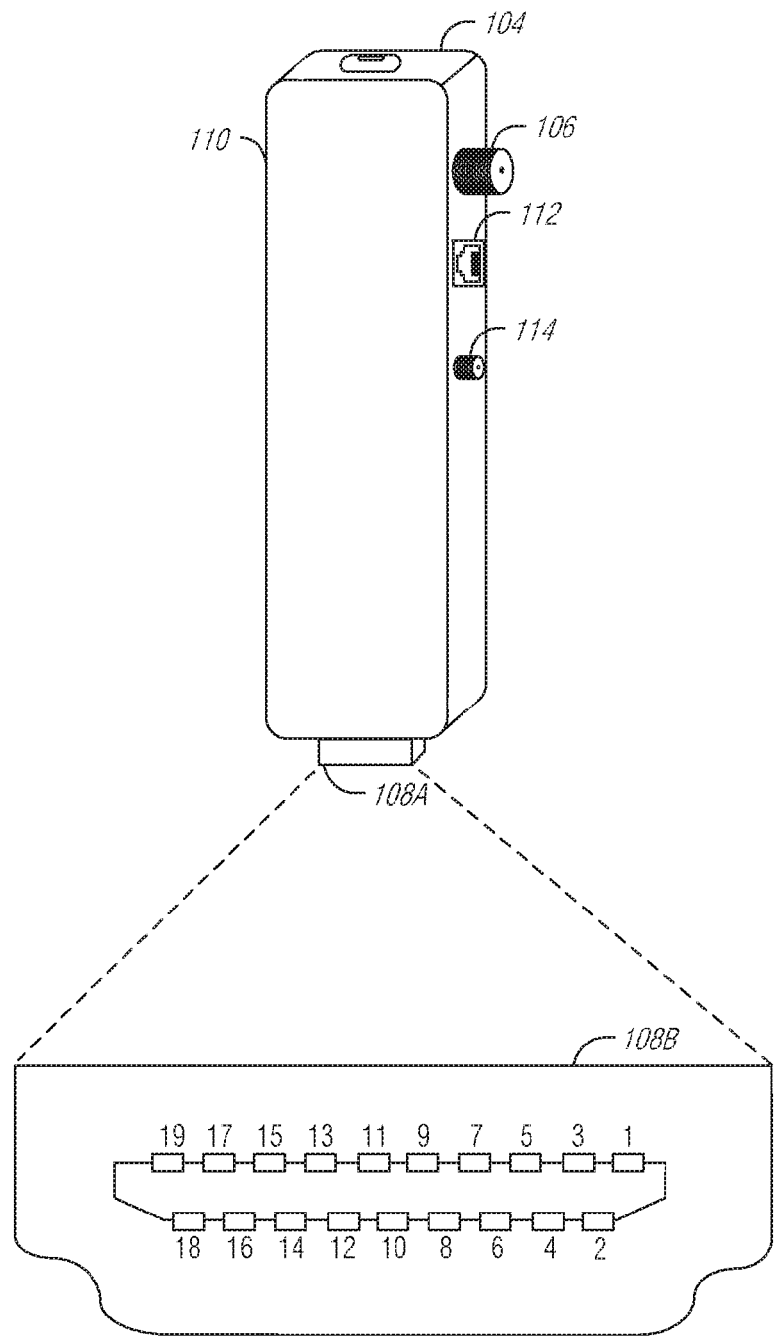
FIG. 1 illustrates an example tuner device in connection with an example further described herein.

FIG. 1 provides an illustration of an example of a tuner device 102 including a power connector 104, an antenna configuration 106, a digital audio video connector 108A, and a housing 110. In an example shown in FIG. 1, the digital audio video connector 108A may be a High-Definition Multimedia Interface (HDMI) connector 108B. The antenna configuration 106 may include an external antenna, an internal antenna, an antenna port, or any combination of these examples. In an example, the antenna configuration 106 receives a digital terrestrial, cable, or satellite television signal, such as an ATSC digital signal. In an example, the power connector 104 may be a female Universal Serial Bus (USB) port, configured to receive a USB cable to power the tuner device 102. The HDMI connector 108B may send and receive data, such as a digital bitstream or unencoded video to and from an external device. The HDMI connector 108B includes 19 pins as is in a standard HDMI connector head. In an example, the HDMI connector 108B may send and receive a device control command (e.g., a Consumer Electronics Control (CEC) command), such as using pin 13 according to some configurations of the HDMI connector 108B. In another example, the digital audio video connector 108A may be a Mobile High-Definition Link (MHL) compliant connector configured to connect to an HDMI port. The MHL connector may be configured to receive power for the tuner device 102 as well as to receive data. When the MI-IL connector is configured to receive power, the power connector 104 may be unused or actually omitted from the tuner device 102.

In an example, the tuner device 102 may include a housing 110, such as a case made of a material or combination of materials such as metal, plastic, or the like. The housing 110 may be substantially rectangular or may have a unique shape such as an "S", an oval, or the like. In some examples, the tuner device 102 may also include an Ethernet port 112. The Ethernet port 112 may be used to connect to a local area network (LAN), a wide area network (WAN), the Internet, or the like. The tuner device 102 may also include an internal or external wireless antenna or, as depicted, a wireless antenna port 114. The wireless antenna or wireless antenna port 114 may be used to connect to a wireless network, such as using Wi-Fi, or a connection with another device, such as using Wi-Fi Direct, or the like. In an example, the wireless antenna or wireless antenna port 114 may be used to transmit digital video and digital audio to a remote display device, such as a desktop computer, laptop, tablet, phone, or the like. In some examples, the tuner device 102 may receive a terrestrial, cable, or satellite transport stream, convert the transport stream to a digital bitstream, transcode the digital bitstream to digital video and digital audio and send the digital video and digital audio to the wireless antenna or wireless antenna port 114 to transmit to the remote display device.

Figure 2:
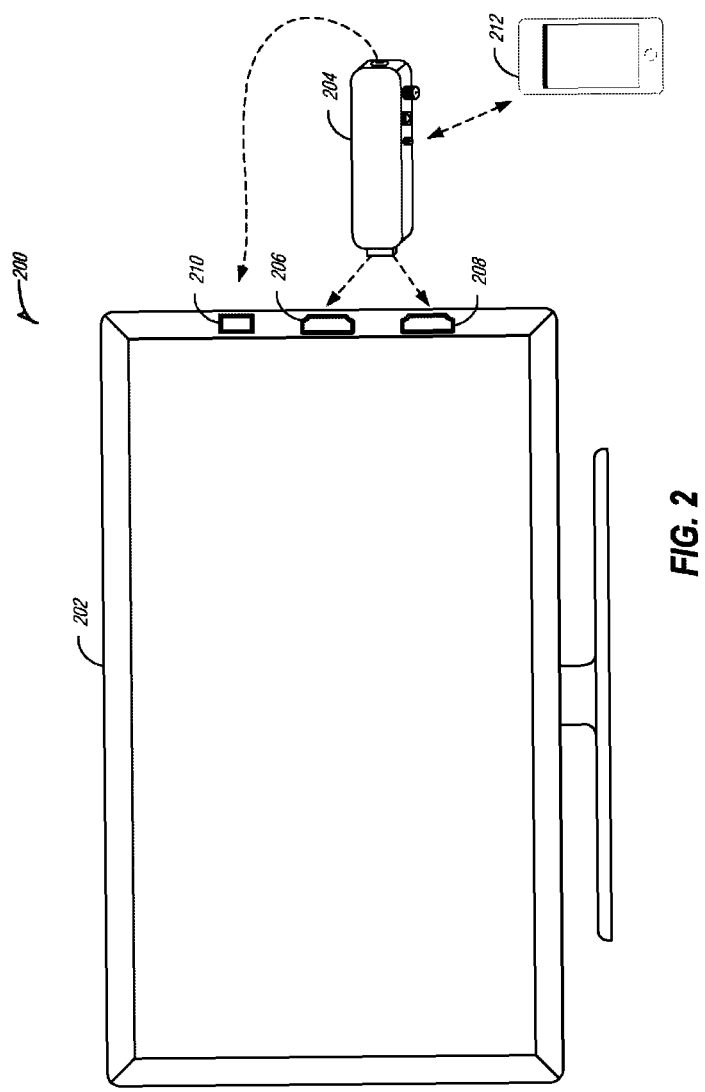
FIG. 2 illustrates an electronic display device having audio video connectors to connect with a tuner device in connection with an example further described herein.

FIG. 2 provides an illustration of a television tuner and display system 200 illustrating a display device 202 and a tuner device 204. As shown in FIG. 2, the display device 202 includes a standard HDMI connector 206 and a MHL enabled HDMI connector, referred to herein as a MHL connector 208. The tuner device 204 may be similar to the tuner device 102 of FIG. 1. In an example, the tuner device 204 may connect to the display device 202 using the standard HDMI connector 206. The tuner device 204, may connect to the standard HDMI connector 206 using a digital audio video connector 108A, such as the HDMI connector 108B, and may be powered by a cord connected to the power connector 104 of FIG. 1. The power for the tuner device 204 when using the HDMI connector 108B may come from a USB port 210 on the display device 202 configured for connection with a USB cable connected to the tuner device 204. The USB port 210 may provide low voltage power for the tuner device 204, which may receive the low voltage input for powering the silicon tuner module and the processing module.

In another example, the tuner device 204 may connect to the display device 202 using the MHL, connector 208. The tuner device 204, may connect to the MHL connector 208 using a digital audio video connector 108A, such as a MHL connector, and may send data over, receive data over, and be powered by, the connector as described above. The MHL connector 208 may provide low voltage power for the tuner device 204, which may receive the low voltage input for powering the silicon tuner module and the processing module. The MHL connector 208 may also use a standard communication protocol, such as a device control command (e.g., a Remote Control Protocol (RCP) command) to communicate with the tuner device 204. A device control command as used herein may refer to a RCP command or a CEC command (among other types of device control commands) and either a RCP command or a CEC command may be used in conjunction with the other (or instead of the other).

In a further example, the display system 200 may include operation of a remote display device 212. The remote display device 212 may be a phone, tablet, computer, monitor, television, or the like. The remote display device 212 may connect to the tuner device 204 using a wireless connection or a USB connection. In an example, the tuner device 204 may send digital video and digital audio to the remote display device 212, such as by using a transceiver on the tuner device 204 and a transceiver on the remote display device 212. A transceiver on the remote display device 212 may receive digital video and digital audio from the tuner device 204. In an example, a transceiver on the remote display device 212 may send a signal including an identifier of a specified channel to the tuner device 204 and may receive digital video and digital audio corresponding to the identifier of a specified channel from the tuner device 204. In an example, a transceiver on the remote display device 212 may send digital video and digital audio content that is received by a transceiver of the tuner device 204, for example, to display or "cast" content from the remote display device 212 to the tuner device 204, that is then processed and output for display on the display device 202.

Figure 3:
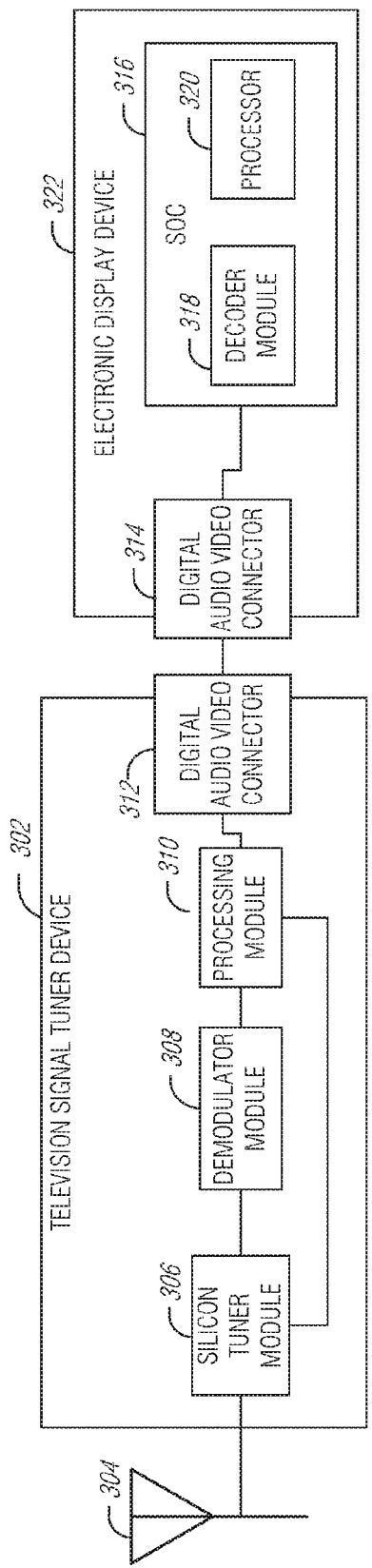
FIG. 3 illustrates component parts of a tuner device and an electronic display device with a decoder module in connection with an example further described herein.

FIG. 3 illustrates component parts of a television signal tuner device 302 and an electronic display device 322 with a decoder module 318. The television signal tuner device 302 may be similar to the tuner devices 102 and 204 of FIGS. 1 and 2, respectively. The electronic display device 322 may be similar to the display device 202 of FIG. 2. In FIG. 3, the television signal tuner device 302 includes a silicon tuner module 306, a demodulator module 308, a processing module 310 configured to adjust the silicon tuner module 306 and the demodulator module 308, and a digital audio video connector 312. The television signal tuner device 302 may also include an antenna 304, an antenna port for connecting to an external antenna, or both. In FIG. 3, the electronic display device 322 includes a system on a chip (SOC) 316 and the SOC 316 is configured to include a decoder module 318 and a processor 320. The SOC 316 may also include a digital to analog converter or an analog to digital converter. The SOC 316 may include any of the components of the television signal tuner device 302, for example to replace or to duplicate any component of the television signal tuner device 302. The television signal tuner device 302 may be used with a television not specially configured for use with the television signal tuner device 302, for example, one having a SOC that duplicates one or more components of the television signal tuner device 302. The television signal tuner device 302 may also be used with a television specially configured to not duplicate all of the components of the television signal tuner device 302, although the television in this example may duplicate one or more components in its SOC. The electronic display device 322 also includes a digital audio video connector 314, configured to couple to the television signal tuner device 302 using the digital audio video connector 312 as shown in the television signal tuner device 302.

In an example, the television signal tuner device 302 may output a digital bitstream, such as a transport stream to the electronic display device 322 using the digital audio video connector 312 to connect to the digital audio video connector 314. The digital bitstream may be compressed or uncompressed video or audio and may be encoded. The digital bitstream may also have a standard format according to a specification, such as a transport stream, a Moving Picture Experts Group (MPEG) transport stream (MPEG-TS or MPEG-2 transport stream). A MPEG transport stream may also include, in addition to audio or video data, Program and System Information Protocol (PSIP) data. The PSIP data may include ATSC metadata about a channel or channels in the MPEG transport stream, such as a title, description, or the like. The digital bitstream may include other metadata as well, such as channel information. The bitstream may be encoded and the decoder module 318 on the electronic display device 322 may decode the digital bitstream.

In an example, the demodulator module 308 may demodulate the digital bitstream or the digital terrestrial, cable, or satellite television signal. The demodulation may include separating a video component and an audio component. Frequency modulation or manipulation may also be done for the video component or the audio component or both together. The demodulator module 308 may decompress a video or audio component. In another example, the television signal tuner device 302 may include an analog to digital converter or a digital to analog converter for converting the digital terrestrial, cable, or satellite television signal, the digital bitstream, or any other data from an analog signal to a digital signal or from a digital signal to an analog signal. The television signal tuner device 302 may include multiple analog to digital converters or multiple digital to analog converters to manipulate multiple data signals or manipulate data signals at different times. The electronic display device 322 may also include one or more analog to digital converters or one or more digital to analog converters.

In an example, the components of the television signal tuner device 302 may be incorporated into another device, such as a digital video disc (DVD) player, Blu-ray player, a video game console, a home entertainment box, a digital video recorder (DVR), or the like. The television signal tuner device 302 may also be connected to an intermediary device using the digital audio video connector 312, such as those devices described above, instead of connecting directly to the electronic display device 322. In another example, the television signal tuner device 302 may include additional features or components, such as a digital video recorder, software, a user interface module, additional digital audio video connectors, additional power or data connectors, memory, or the like. The television signal tuner device 302 may send additional information to the television using the digital audio video connector 312, such as images, commands, or other data. The components of the television signal tuner device 302 may be included on a system on a chip or as separate components or in some combination of the two.

The television signal tuner device 302 may have a wireless communication module that may use wireless communication standards over respective wireless mediums, including Bluetooth, IEEE 802.11 a/b/g/n/ac (Wi-Fi), 3GPP Long Term Evolution/Long Term Evolution-Advanced (LTE/LTE-A), IEEE 802.16 (WiMAX), WirelessHD, Wi-Fi Direct, Wireless Home Digital Interface (WHDI), Digital Living Network Alliance (DLNA), Digital Audio Access Protocol (DAAP), Universal Plug and Play (UPnP), infrared (IR), radio frequency (RF), or the like communications which may be defined according to respective standards families and standards groups. The television signal tuner device 302 may include an over-the-top modules configured to receive over-the-top content, such as internet streaming video services, internet radio, or the like. For example, the television signal tuner device 302 may include an internet video module configured to display streaming video, such as Netflix, YouTube, Hulu, or the like. In another example, the television signal tuner device 302 may include a software module configured to provide applications (apps) to a user.

In an example, the television signal tuner device 302 may include a voice control module for receiving voice commands from a user. The voice control module may allow a user to change channels, adjust volume up or down, or otherwise change the output of the television signal tuner device 302. Additional features may be included in the television signal tuner device 302, such as wireless audio functionality to send audio to remote speakers, an integrated channel map or guide, a list of received channels, a list of online virtual channels or streaming programs, a combination of channels from any of the above, or the like.

In an example, the television signal tuner device 302 may include a module configured to receive a peer-to-peer wireless screencasting signal, such as in a Wi-Fi Direct format (e.g., a Miracast standard wireless communication). The Wi-Fi Direct connection may be used by the television signal tuner device 302 to receive an audio-visual signal from a desktop personal computer, tablet, mobile phone, or the like. The television signal tuner device 302 may convert the received signal from the Miracast standard to a digital bitstream and output the digital bitstream on the digital audio video connector 312 to the electronic display device 322. The signal from a device sent using the Miracast standard may be displayed on the electronic display device 322 in real-time or near real-time. The television signal tuner device 302 may include a module to output a graphical user interface to display options for choosing a Miracast signal if more than one is present.

Figure 4:
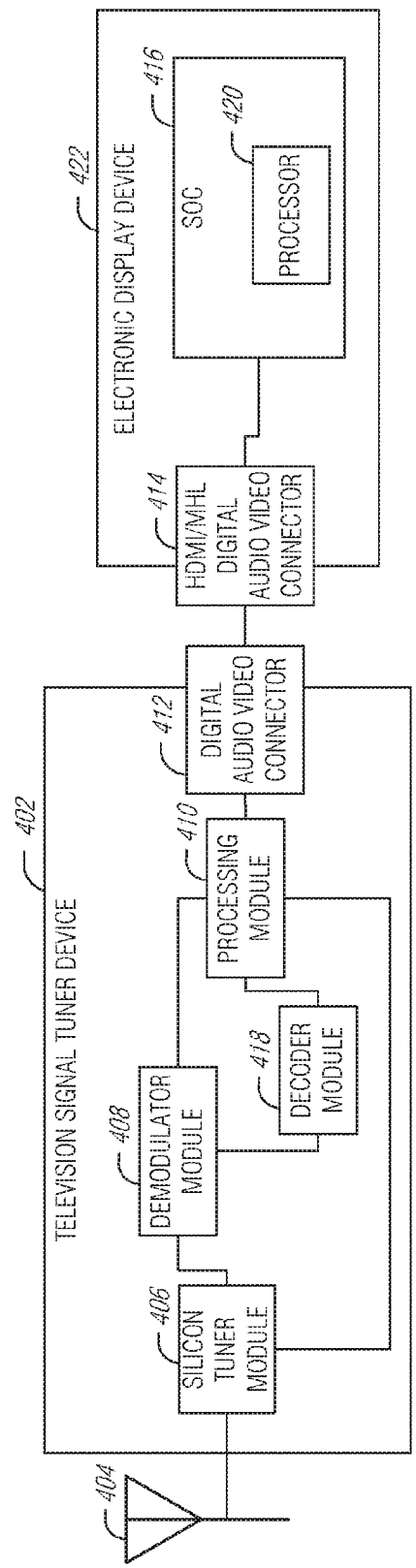
FIG. 4 illustrates component parts of a tuner device with a decoder module and an electronic display device in connection with an example further described herein.

FIG. 4 illustrates component parts of a television signal tuner device 402 with a decoder module 418 and an electronic display device 422. The television signal tuner device 402 may be similar to the tuner devices 102, 204, and 302 of FIGS. 1, 2, and 3 respectively. The electronic display device 422 may be similar to the display device 202 of FIG. 2 and the electronic display device 322 of FIG. 3. In FIG. 4, the television signal tuner device 402 includes a silicon tuner module 406, a demodulator module 408, a decoder module 418, a processing module 410 configured to adjust the silicon tuner module 406, the demodulator module 408, and the decoder module 418, and a digital audio video connector 412. The television signal tuner device 402 may also include an antenna 404, an antenna port for connecting to an external antenna, or both. The antenna port may include a cable connector, such as a coaxial cable or other shielded cable.

In FIG. 4, the electronic display device 422 includes a television system on a chip (SOC) 416 and the SOC 416 is configured to include a processor 420. The television signal tuner device 402 may be used with a television not specially configured for use with the television signal tuner device 402, for example, one having a SOC that duplicates one or more components of the television signal tuner device 402. The television signal tuner device 402 may also be used with a television specially configured to not duplicate all of the components of the television signal tuner device 402, although the television in this example may duplicate one or more components in its SOC. The electronic display device 422 also includes a HDMI/MHL digital audio video connector 414, configured to couple to the television signal tuner device 402 using the digital audio video connector 412 as shown in the television signal tuner device 402 of FIG. 4.

In an example, the television signal tuner device 402 may output digital video and digital audio to the electronic display device 422 using the digital audio video connector 412 to connect to the HDMI/MHL digital audio video connector 414. The digital bitstream may be compressed or uncompressed video or audio. In an example, the digital audio video connector 412 may output unencoded (decoded) compressed and decompressed video data and unencoded (decoded) compressed and decompressed audio data to the electronic display device 422. The digital bitstream may also have a standard format according to a specification, such as a Moving Picture Experts Group (MPEG) decoded video and audio stream. The digital bitstream may be a decoded audio video stream and may also include, in addition to audio or video data, metadata, such as a title, description, or the like. In an example, the digital bitstream may be decoded by the decoder module 418, on the television signal tuner device 402, before being sent to the electronic display device 422 using the digital audio video connector 412 and the HDMI/MHL digital audio video connector 414. The decoded audio video data may be viewed directly on the electronic display device 422 without further decoding or demodulation.

In an example, the demodulator module 408 may demodulate the digital bitstream or the digital terrestrial, cable, or satellite television signal. The demodulation may include separating a video component and an audio component. Frequency modulation or manipulation may also be done for the video component or the audio component or both together. The demodulator module 408 may decompress a video or audio component. In another example, the television signal tuner device 402 may include an analog to digital converter or a digital to analog converter for converting the digital terrestrial, cable, or satellite television signal, the digital bitstream, or any other data from an analog signal to a digital signal or from a digital signal to an analog signal. The television signal tuner device 402 may include multiple analog to digital converters or multiple digital to analog converters to manipulate multiple data signals or manipulate data signals at different times. The electronic display device 422 may also include one or more analog to digital converters or one or more digital to analog converters.

Figure 5:
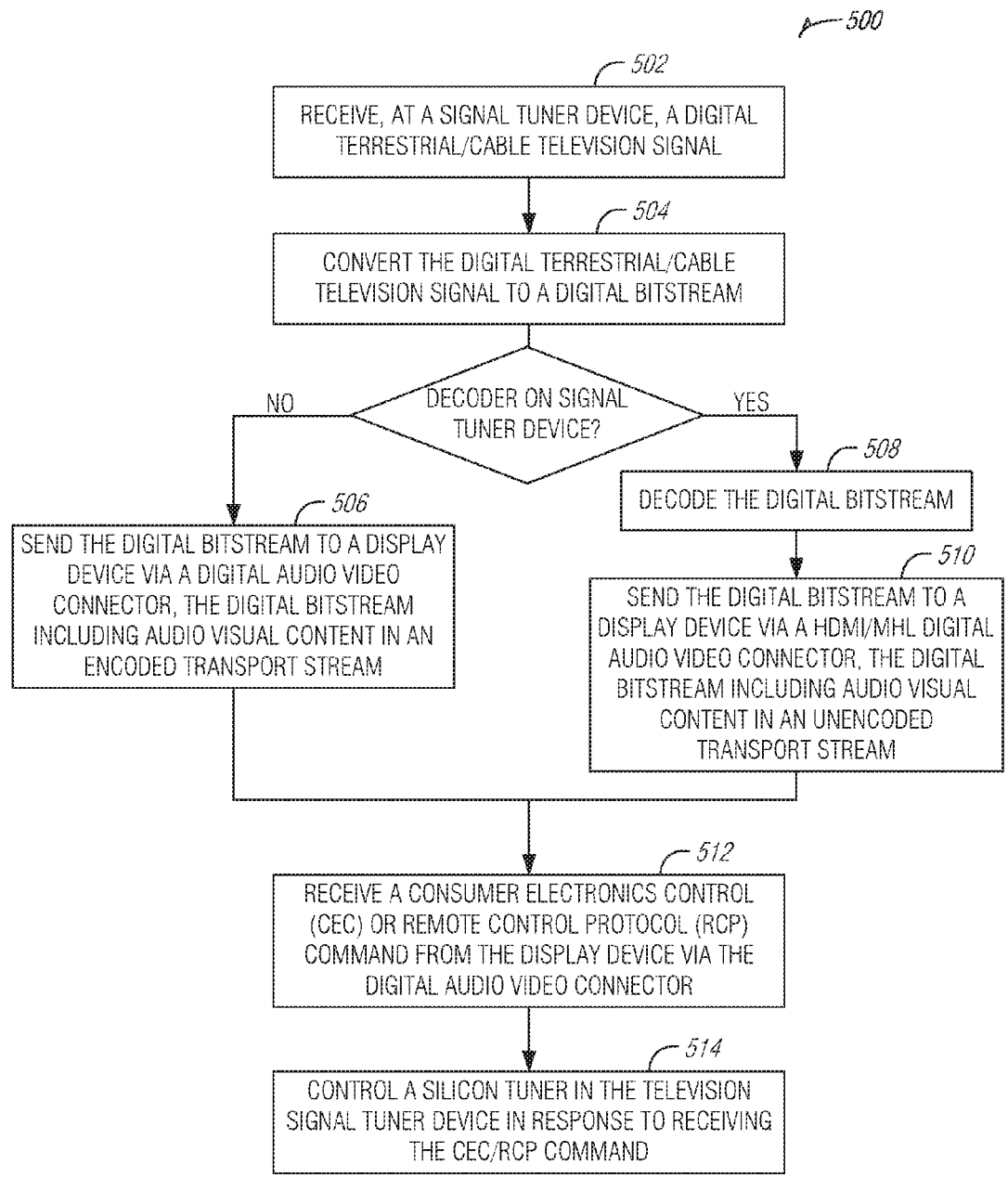
FIG. 5 illustrates a flowchart of a technique to operate a television tuner device in connection with an example further described herein.

FIG. 5 provides an illustration of a flowchart 500 for a technique to operate a television tuner device according to an example. First, a digital terrestrial, cable, or satellite television signal is received at a television signal tuner device (operation 502). The digital terrestrial, cable, or satellite television signal is then converted to a digital bitstream (operation 504). After converting, the technique may include sending the digital bitstream to a display device via a digital audio video connector, the digital bitstream including audio visual content in an encoded transport stream (operation 506) or may include decoding the digital bitstream (operation 508) and sending the digital bitstream to a display device via a HDMI/MHL digital audio video connector, the digital bitstream including audio visual content in an unencoded transport stream (operation 510). The technique may also include receiving a device control command (e.g., a consumer electronics control (CEC) or a remote control protocol (RCP) command) from the display device via the digital audio video connector (operation 512) and controlling a silicon tuner in the television signal tuner device in response to receiving the device control (e.g., CEC/RCP) command (operation 514).

In an example, the television signal tuner device may include a module to output a graphical user interface to display options for choosing a channel, adjusting the volume up or down, or otherwise changing the output of the television signal tuner device in response to the device control command. Other commands specific to the television or television signal tuner device may also be communicated in connection with the processing and communication of such device control commands.

For purposes of communicating using HDMI/MHL device control (e.g., CEC/RCP) commands, the television signal tuner device may broadcast a logical address associated with its physical address to the display device. For example, the display device may have a physical address of 0.0.0.0 and a logical address of 0 and the television signal tuner device may have a physical address of 2.2.0.0 and a logical address of 3, or otherwise according to a specification, such as the CEC standard detailed in a HDMI specification, (e.g., HDMI release version 1.0 or later) or the RCP standard detailed in a MHL specification (e.g., MHL release version 1.0 or later). A device control command sent from the display device to the television signal tuner device may include a device identification command, a "user control pressed" command to simulate remote control codes, and an action command. For example, the device control command may instruct the television signal tuner device to play a channel, change a channel, change a volume control, go to a menu, change output mode (e.g., switch to digital terrestrial, cable, or satellite television signals, Miracast, online streaming, DVR, etc.), or navigate a menu. Device control commands may also be used to turn the television signal tuner device on or off activate or deactivate video or audio, activate or deactivate a user interface, or the like. In an example, the television signal tuner device may send a device control command to control the display device, such as to adjust a volume setting, turn the display device on or off, change the input of the display device (e.g., to or from the television signal tuner device output), activate or deactivate a user interface, change an audio output device or format, change a video display format, or the like. In another example, a remote control transceiver may send any of the above device control commands to and from the display device and to and from the television signal tuner device, acting as an intermediary. In an example, according to a CEC command standard in the HDMI specification, a device may be either a sink or a source. In an example, the display device may be a sink and the television signal tuner device may be a source. The sink may receive audio visual content from the source. The display device may use a processor to determine whether a device connected to an HDMI connector is an HDMI device or a MHL device. A device identification (device ID) for the signal tuner device may be used by a processor in the display device to determine if the signal tuner device is HDMI capable or MHL capable or both. The device ID may also allow a processor in the display to determine other capabilities of the device. A HDMI capable signal tuner device may be powered using a USB cord, connected to the signal tuner device on one end and a wall outlet converter or a display device on the other end. A MHL capable signal tuner device may be powered using the MHL connection with the display device.

Figure 6:
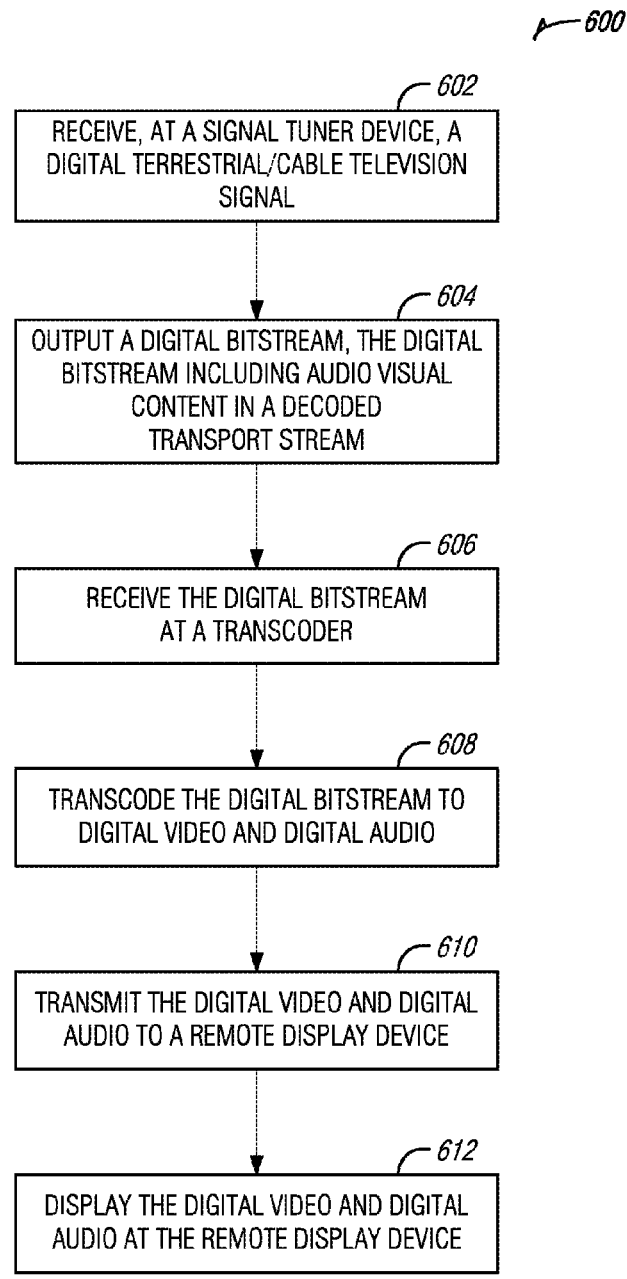
FIG. 6 provides an illustration of a flowchart of a technique to display digital video and digital audio at a remote display device using a signal tuner device in connection with an example further described herein.

FIG. 6 provides an illustration of a flowchart 600 of a technique to display digital video and digital audio at a remote display device using a signal tuner device. As shown, the technique is initiated by receiving, at a signal tuner device, a digital terrestrial, cable, or satellite television signal (operation 602). The process may include converting the digital terrestrial, cable, or satellite television signal to a digital bitstream, and may further include operations to output a digital bitstream, the digital bitstream including audio visual content in an encoded transport stream (operation 604). The technique includes receiving the digital bitstream at a transcoder (operation 606) and transcoding or transforming the bitstream to digital video and digital audio, such as digital video and digital audio corresponding to a specified channel (operation 608). The technique also includes transmitting the digital video and digital audio to a remote display device, such as a tablet, desktop computer, laptop, phone, etc. (operation 610). The technique includes displaying the digital video and digital audio at the remote display device (operation 612). In an example, the technique may include receiving a device control command (e.g., a Consumer Electronics Control (CEC) or a Remote Control Protocol (RCP) command) from a display device via the digital audio video connector, and controlling a silicon tuner or other display functionality in the television signal tuner device in response to receiving the device control (e.g., CEC or RCP) command. In further examples, the television signal tuner device may receive control commands from the remote display device.

In an example, a signal tuner device may include modes. The modes may include a first mode and a second mode. For example, when in the first mode, the signal tuner device may transmit digital video and digital audio to a remote display device over a wireless connection (e.g., Wi-Fi Direct, Bluetooth, etc.). When in the second mode, the signal tuner device may send digital video and digital audio to a local display device, such as via a digital audio video connector. The signal tuner device may change between the first mode and the second mode, for example in response to receiving a device control command (e.g., IR signal, RF signal, CEC/RCP command, etc.). In an example, when the signal tuner device receives a digital control command to change modes from the first mode to the second mode, the signal tuner device may cease transmitting the digital video and digital audio to the remote display device. Similarly, when the signal tuner device receives a digital control command to change modes from the second mode to the first mode, the signal tuner device may cease sending the digital video and digital audio to the local display device.

In another example, the signal tuner device may send digital video and digital audio to a local display device via a digital audio video connector and then receive a device control command from a local display device via the digital audio video connector, from a remote control device over a wireless connection, from a remote display device over a wireless connection, or the like. In response to receiving the device control command, the signal tuner device may transmit digital video and digital audio to a remote display device. In an example, the signal tuner device may transmit digital video and digital audio substantially simultaneously to multiple remote display devices. In another example, the signal tuner device may transmit or send digital video and digital audio concurrently (e.g., substantially simultaneously) via a wireless connection to a remote display device and via a digital audio video connector to a local display device. In another example, the signal tuner device may transmit concurrently (e.g., substantially simultaneously) to multiple remote display devices or multiple local display devices or any combination of remote display devices and local display devices.

The operations exemplified in FIGS. 5 and 6 may be performed in any order and may be combined with other operations not shown. Further, the operations exemplified in FIGS. 5 and 6 may be performed among multiple processing units, hardware modules, or devices.

Figure 7:
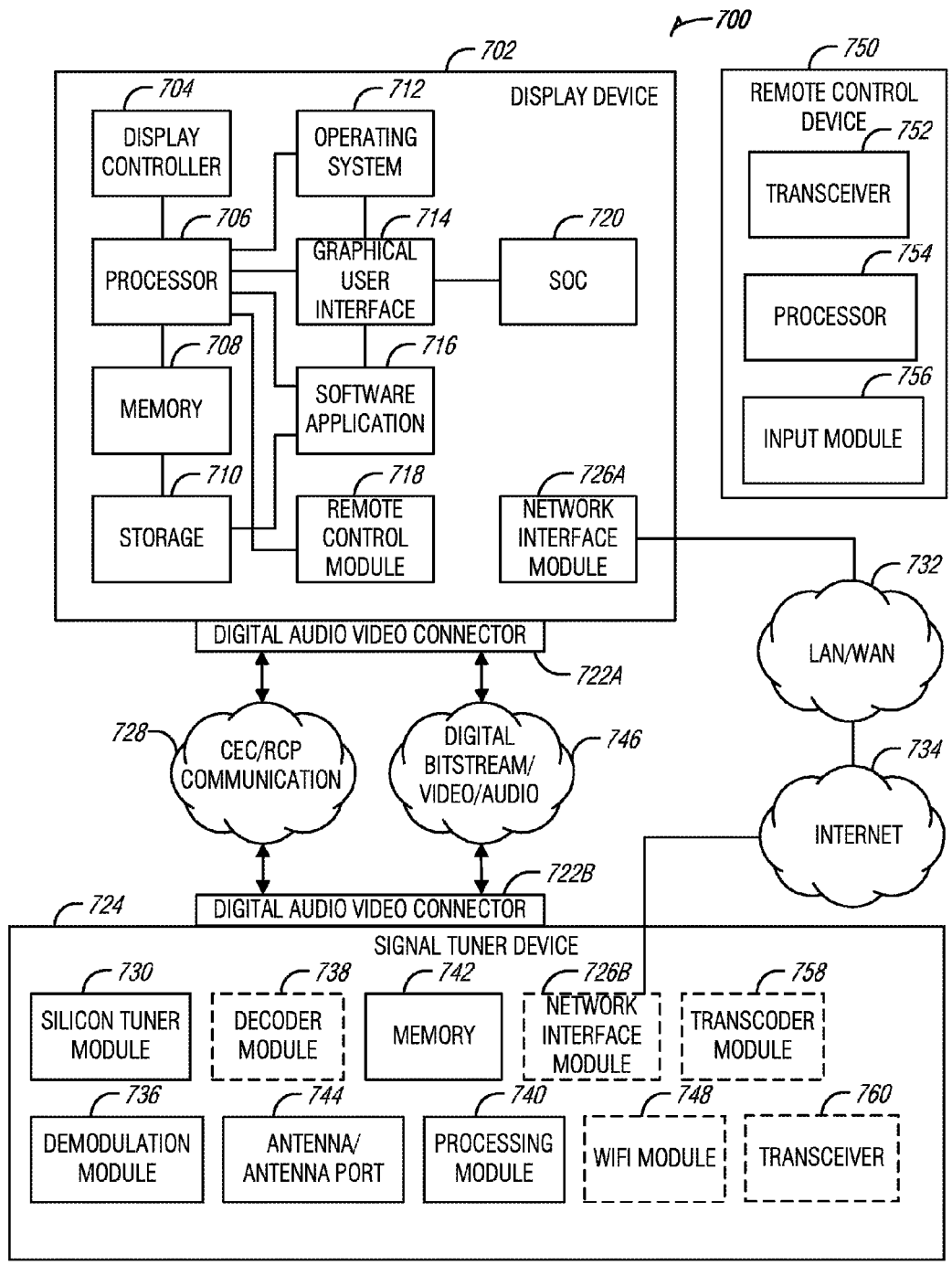
FIG. 7 illustrates a configuration of an electronic display device in accordance with an example further described herein.

FIG. 7 provides an illustration of a block diagram 700 for an example architecture for operation with a display device 702, configured for implementing the example techniques described herein. In some examples, the display device 702 may include an output screen (not shown) such as a liquid crystal display (LCD), light-emitting diode (LED) display, organic light-emitting diode (OLED) display, cathode ray tube display, plasma display panel, or digital light processing (DLP) display, to directly provide an audiovisual output. In some examples, the display device 702 may include functionality to directly receive user input with use of the output screen, such as with use of a touch screen input mechanism, or the display device 702 may receive user input in connection with other input processing components such as a video camera and video processing system configured to perform gesture-based detection and movement.

As shown, the display device 702 is coupled to one or more of audiovisual content sources, accessed through an analog processing component such as a tuner, a digital video processing component, or a digital audio processing component. The display device 702 may also receive content using a network interface module 726A, to establish a connection to receive content from the internet 734 via a local area network or wide area network connection 732. The signal tuner device 724 may also optionally receive content using a network interface module 726B, to establish a connection to receive content from the internet 734 via a local area network or wide area network connection 732. In an example, the signal tuner device 724 and the display device 702 may use the network interface module 726A and the network interface module 726B to connect to the same or different local area networks or wide area networks to connect to the internet 734. The network interface modules 726A or 726B may include or may connect to a local area network (LAN) connector.

The display device 702 is further configured to receive interaction with a remote or other user input control via infrared (IR), radio frequency (RF), Wi-Fi (e.g., IEEE 802.11 standard), or similar wireless communication using the remote control module 718 and provide control of device operations through use of the processor 706. In an example, the remote control module 718 may communicate with a remote control device 750. The remote control device 750 may include a transceiver 752 for transmitting or receiving signals, such as IR, RF, or Wi-Fi commands. The remote control device 750 may also include a processor 754 and an input module 756. The input module 756 may include buttons, a user interface, a display device, or the like for receiving commands from a user. In another example, the remote control device 750 may communicate directly with the signal tuner device 724.

The display device 702 has a digital audio video connector 722A that, using a digital audio video connector 722B, connects to the signal tuner device 724. Using the digital audio video connector 722A, the display device 702 may send commands using device control (e.g., CEC/RCP) communication 728 to interact with a signal tuner device 724. The display device 702 may control the signal tuner device 724 or a silicon tuner module 730 via a device control (e.g., CEC/RCP) command using the device control (e.g., CEC/RCP) communication 728 between the digital audio video connector 722A and the digital audio video connector 722B. The display device 702 may receive a command using the remote control module 718 and convert the command to a device control (e.g., CEC/RCP) command and use that device control (e.g., CEC/RCP) command to control any of the components of the signal tuner device 724. The signal tuner device 724 may include an antenna or antenna port 744 for receiving a digital terrestrial, cable, or satellite television signal and output that signal as a digital bitstream or digital video and digital audio 746. The digital bitstream or digital video and digital audio 746 may be sent from the signal tuner device 724 using the digital audio video connector 722B to display device 702 using the digital audio video connector 722A. The digital bitstream or digital video and digital audio 746 may include encoded, decoded, or unencoded audio visual content, an audio video transport stream, or the like.

A silicon tuner module 730 and demodulation module 736 may also be included in the signal tuner device 724 for manipulating the digital bitstream. The signal tuner device 724 may optionally include a decoder module. 738 or a decoder module may optionally be included in a system on a chip (SOC) 720. The signal tuner device 724 may also include a processing module 740 and memory 742 to provide audio visual content and respond to user interactions with the display device 702. The silicon tuner module 730 or the demodulation module 736 may include a filter, such as a radio frequency filter or a filter to convert a signal to an intermediate frequency, a baseband frequency, or the like.

The operations of the display device 702 may be implemented through use of a display controller 704, processor 706, memory 708, and storage component 710. The processor 706 may be operably coupled to the display controller 704, the memory 708, and the storage component 710, to facilitate operations of an operating system 712, graphical user interface 714, and one or more software application(s) 716. For example, instructions for execution of the graphical user interface 714 and the software application(s) 716 may be provided in the storage component 710, loaded into the memory 708, and executed by the processor 706.

The operating system 712 may provide various functions and features to facilitate operation of the graphical user interface 714 and the various software application(s) 716, including the interface and applications to implement the input selection mechanisms and on-screen display configurations described herein. The operating system 712, graphical user interface 714, and software application(s) 716 may be configured for upgrading through either a local connection and commands (e.g., a universal serial bus (USB) port) or a remote connection and commands (e.g., on internet service) to obtain and deploy upgraded software.

In an example, a remote receiver device may be configured to couple to the signal tuner device 724 and the display device 702. For example, the remote receiver device may be coupled between the signal tuner device 724 and the display device 702 such that the display device 702 may send a device control (e.g., CEC/RCP) command to the signal tuner device 724 using the remote receiver device as an intermediary. In another example, the remote receiver device may receive a signal from another source, such as an infrared or other command from a remote control device. The remote receiver may then send a device control (e.g., CEC/RCP) command to the signal tuner device 724 and may optionally sending an indication to the display device 702 or may not send an indication to the display device 702. For example, the remote receiver device may couple to the signal tuner device 724 and the display device 702 and receive a signal from a remote control device, the signal including a specified channel. The remote receiver device may send information about the specified channel to the signal tuner device 724 using a device control (e.g., CEC/RCP) command. The silicon tuner module 730 may use the antenna or antenna port 744 of the signal tuner device 724 to receive and filter the specified channel into a digital bitstream. In an example, the remote receiver device may communicate with the remote control device 750.

The signal tuner device 724 may optionally include a Wi-Fi module 748. The module 748 may communicate with a router or directly with a device, such as a tablet, computer, phone, or other display device. Any of the Wi-Fi module 748, the antenna or antenna port 744, the processing module 740, the decoder module 738, the processor 706, or the SOC 720, may include transcoders for encoding, decoding, or transcoding transport streams, video, audio, data, or the like.

In another example, the signal tuner device 724 may include a transcoder module 758. The transcoder module 758 may include an encoder, a decoder, a transcoder or the like. The transcoder module 758 may include a transcoder configured to decompress a video compression format, such as h.264 or MPEG-4. The transcoder module 758 may receive an input of a digital bitstream and output digital video and digital audio. The transcoder module 758 may output digital video and digital audio corresponding to a specified channel. The signal tuner device may receive an input of a terrestrial, cable, or satellite television signal and, using the transcoder, output an h.264 video format and stream that h.264 video format over Wi-Fi or via a LAN to a remote display device, such as a smartphone, tablet, or laptop.

In an example, the signal tuner device 724 may include a transceiver 760. The transceiver 760 may include a receiver, a transmitter, or the like. The transceiver 760 may transmit or receive digital video and digital audio, a digital bitstream, instructions, or other data. The transceiver 760 may communicate with a remote display device, a local display device, or a remote control device. A remote control device may send a signal that is received by the transceiver 760. The signal received by (e.g., sent to) the transceiver 760 may include information about a specified channel, a volume or channel indication (e.g., a relative or absolute change), a power indication (e.g., turn on or turn off), or the like. When the transceiver 760 receives a signal including an identifier of a specified channel, the transceiver 760 may send the identifier of the specified channel to the display device 702 using a device control (e.g., CEC/RCP) command. The transceiver 760 may also send the identifier of the specified channel to the silicon tuner module 730 or the processing module 740 to change the channel, or control other functionality of the sign tuner device 724 or the display device 702.

Embodiments of the techniques and configurations may be implemented within a variety of systems and display devices, including televisions, monitors, projectors, and other video display screens, in addition to display devices without a screen or other direct video output. Other devices which provide a line-out or stream audiovisual signals may also be used in connection with the user interface described herein. As used herein, audio visual content refers to content including both audio and visual characteristics, as well as content providing exclusively audio characteristics or exclusively visual characteristics.

Embodiments may be implemented in connection with wired and wireless networks, across a variety of digital and mediums. Although some of the previously described techniques and configurations were provided with reference to implementations of consumer electronic devices with wired or physically coupled digital signal connections, these techniques and configurations may also be applicable to display of content from wireless digital sources from a variety of local area wireless multimedia networks and network content accesses using WLANs, WWANs, and wireless communication standards. Further, the previously described techniques and configurations are not limited to input sources provided from a direct analog or digital signal, but may be applied used with any number of multimedia streaming applications and protocols to provide display content over an input link.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer or other processor-driven display device). For example, a machine-readable storage device may include read-only memory (ROM), random-access memory (RAM), magnetic disk storage media, optical storage media, flash-memory devices, and other storage devices and media. In some embodiments, display devices such as televisions, A/V receivers, set-top boxes, and media players may include one or more processors and may be configured with instructions stored on such machine-readable storage devices.

Various Notes & Examples

Additional examples of the presently described method, system, and device embodiments are suggested according to the structures and techniques described herein. Other non-limiting examples may be configured to operate separately, or may be combined in any permutation or combination with any one or more of the other examples provided above or throughout the present disclosure.

Example 1 includes the subject matter embodied by a television signal tuner device comprising: a silicon tuner module configured to receive a digital terrestrial television signal and output a digital bitstream, the digital bitstream including audio visual content in an encoded transport stream, a digital audio video connector configured to couple with a display device, the digital audio video connector configured to provide the digital bitstream to the display device according to a specification, and a processing module configured to control the silicon tuner module in response to a device control command received from the display device via the digital audio video connector.

In Example 2, the subject matter of Example 1 may optionally include wherein the digital audio video connector is a High-Definition Multimedia Interface (HDMI) connector and the device control command is a HDMI Consumer Electronics Control (CEC) command, and the television signal tuner device further comprising a power input source configured to receive a low voltage input for the silicon tuner module and the processing module.

In Example 3, the subject matter of one or any combination of Examples 1-2 may optionally include wherein the digital audio video connector is a Mobile High-Definition Link (MHL) connector, and the device control command is a MHL Remote Control Protocol (RCP) command, and the television signal tuner device further configured to receive power for the silicon tuner module and the processing module via the MHL connector.

In Example 4, the subject matter of one or any combination of Examples 1-3 may optionally include wherein the device is configured to output a signal including audio, video, and Program and System Information Protocol data in a Moving Picture Experts Group (MPEG) Transport Stream.

In Example 5, the subject matter of one or any combination of Examples 1-4 may optionally include further comprising an antenna or an antenna port.

In Example 6, the subject matter of one or any combination of Examples 1-5 may optionally include wherein the digital terrestrial television signal is an Advanced Television Systems Committee (ATSC) signal.

In Example 7, the subject matter of one or any combination of Examples 1-6 may optionally include wherein the silicon tuner module comprises a radio frequency filter.

In Example 8, the subject matter of one or any combination of Examples 1-7 may optionally include further comprising, a demodulation module configured to demodulate a digital video component and a digital audio component of the digital terrestrial television signal.

Example 9 includes the subject matter embodied by a television signal tuner device comprising: a silicon tuner module configured to receive a digital terrestrial television signal and output a digital bitstream, the digital bitstream including audio visual content, a decoder module configured to transform the digital bitstream to digital video and digital audio corresponding to a specified channel, a digital audio video connector configured to couple with a display device, the digital audio video connector configured to provide the digital video and digital audio to the display device according to a specification, and a processing module configured to control the silicon tuner module in response to a device control command received from the display device via the digital audio video connector.

In Example 10, the subject matter of Example 9 may optionally include wherein the digital audio video connector is a High-Definition Multimedia interface (HDMI) connector and the device control command is a HDMI Consumer Electronics Control (CEC) command, and the television signal tuner device further comprising a power input source configured to receive a low voltage input for the silicon tuner module and the processing module.

In Example 11, the subject matter of one or any combination of Examples 9-10 may optionally include wherein the digital audio video connector is a Mobile High-Definition Link (MHL) connector and the device control command is a MHL Remote Control Protocol (RCP) command, and the television signal tuner device further configured to receive power for the silicon tuner module and the processing module via the MHL connector.

In Example 12, the subject matter of one or any combination of Examples 9-11 may optionally include further comprising an antenna or an antenna port.

In Example 13, the subject matter of one or any combination of Examples 9-12 may optionally include wherein the digital terrestrial television signal is an Advanced Television Systems Committee (ATSC) signal.

In Example 14, the subject matter of one or any combination of Examples 9-13 may optionally include wherein the silicon tuner module comprises a radio frequency filter.

In Example 15, the subject matter of one or any combination of Examples 9-14 may optionally include further comprising, a demodulation module configured to demodulate a digital video component and a digital audio component of the digital terrestrial television signal.

Example 16 includes the subject matter embodied by a method of operation for a television tuner device comprising: receiving, at a television signal tuner device, a digital terrestrial television signal, converting the digital terrestrial television signal to a digital bitstream, sending the digital bitstream to a display device via a digital audio video connector, the digital bitstream including audio visual content in an encoded transport stream, receiving a device control command from the display device via the digital audio video connector, and controlling a silicon tuner in the television signal tuner device in response to receiving the device control command.

In Example 17, the subject matter of Example 16 may optionally include wherein the digital audio video connector is a High-Definition Multimedia Interface (HDMI) connector and the device control command is a HDMI Consumer Electronics Control (CEC) command, and wherein the television signal tuner device is configured to receive a low voltage input at a power input source.

In Example 18, the subject matte of one or any combination of Examples 16-17 may optionally include wherein the digital audio video connector is a Mobile High-Definition Link (MHL) connector and the device control command is a MHL Remote Control Protocol (RCP) command, and wherein the television signal tuner device is configured to receive power via the Milt, connector.

In Example 19, the subject matter of one or any combination of Examples 16-18 may optionally include wherein the digital terrestrial television signal is an Advanced Television Systems Committee (ATSC) signal.

In Example 20, the subject matter of one or any combination of Examples 16-19 may optionally include wherein the television signal tuner device includes a radio frequency filter.

In Example 21, the subject matter of one or any combination of Examples 16-20 may optionally include further comprising demodulating a digital video stream and a digital audio stream from the digital terrestrial television signal.

Example 22 includes the subject matter embodied by a system comprising: a signal tuner device, comprising: a silicon tuner module configured to receive a digital terrestrial television signal and output a digital bitstream, the digital bitstream including audio visual content in an encoded transport stream, and a display device configured to couple with the signal tuner device, the display device comprising: a processor configured to send a device control command to the signal tuner device via a digital audio video connector, and a display screen to display audio visual content from the digital bitstream.

In Example 23, the subject matter of Example 22 may optionally include further comprising a remote receiver device configured to: couple to the signal tuner device and the display device, receive a signal from a remote control device, the signal including an identifier of a specified channel, send the identifier of the specified channel to the signal tuner device using a device control command.

In Example 24, the subject matter of one or any combination of Examples 22-23 may optionally include wherein the digital audio video connector is a High-Definition Multimedia Interface (HDMI) connector the device control command is a HDMI Consumer Electronics Control (CEC) command, and the signal tuner device further comprising a power input source configured to receive a low voltage input for the silicon tuner module.

In Example 25, the subject matter of one or any combination of Examples 22-24 may optionally include wherein the digital audio video connector is a Mobile High-Definition Link (MHL) connector and the device control command is a MHL Remote Control Protocol (RCP) command, and the signal tuner device further configured to receive power for the silicon tuner module via the MHL connector.

Example 26 includes the subject matter embodied by a television signal tuner device, comprising: a silicon tuner module configured to receive a digital terrestrial television signal and output a digital bitstream, the digital bitstream including audio visual content, a transcoder module configured to convert the digital bitstream from a first encoding to a second encoding for digital video and digital audio corresponding to a tuned channel, a transceiver configured to wirelessly transmit the digital video and digital audio to a remote display device, and a digital audio video connector configured to couple with a local display device, the digital audio video connector configured to provide the digital video and digital audio to the display device.

In Example 27, the subject matter of Example 26 may optionally include further comprising, a processing module configured to control the silicon tuner module in response to a device control command received from the local display device via the digital audio video connector.

In Example 28, the subject matter of one or any combination of Examples 26-27 may optionally include wherein the digital audio video connector is a High-Definition Multimedia Interface (HDMI) connector and the device control command is a HDMI Consumer Electronics Control (CEC) command, and the television signal tuner device further comprising a power input source configured to receive a low voltage input for the silicon tuner module and the processing module.

In Example 29, the subject matter of one or any combination of Examples 26-28 may optionally include wherein the digital audio video connector is a Mobile High-Definition Link (MHL) connector and the device control command is a MHL Remote Control Protocol (RCP) command, and the television signal tuner device further configured to receive power for the silicon tuner module and the processing module via the MHL connector.

In Example 30, the subject matter of one or any combination of Examples 26-29 may optionally include further comprising an antenna or an antenna port.

In Example 31, the subject matter of one or any combination of Examples 26-30 may optionally include wherein the digital terrestrial television signal is an Advanced Television Systems Committee (ATSC) signal.

In Example 32, the subject matter of one or any combination of Examples 26-31 may optionally include wherein the silicon tuner module comprises a radio frequency filter.

In Example 33, the subject matter of one or any combination of Examples 26-32 may optionally include further comprising, a demodulation module configured to demodulate a digital video component and a digital audio component of the digital terrestrial television signal.

Example 34, the subject matter of one or any combination of Examples 26-33 may optionally include wherein the transceiver is configured to: receive a signal from the remote display device, the signal including an identifier of a specified virtual channel, and wherein to convert the digital bitstream, the transcoder module is configured to convert the digital bitstream from a first encoding to a second encoding for digital video and digital audio corresponding to the specified virtual channel.

Example 35 includes the subject matter embodied by a method of operation for a television tuner device, comprising: receiving, at a television signal tuner device, a digital terrestrial television signal, converting the digital terrestrial television signal to a digital bitstream, transcoding the digital bitstream to digital video and digital audio corresponding to a channel, sending the digital video and digital audio to a local display device via a digital audio video connector, receiving a device control command from the local display device via the digital audio video connector, and in response to receiving the device control command, transmitting the digital video and digital audio to a remote display device.

In Example 36, the subject matter of Example 35 may optionally include further comprising, in response to receiving the device control command, ceasing sending the digital video and digital audio to the local display device.

In Example 37, the subject matter of one or any combination of Examples 35-36 may optionally include wherein the digital audio video connector is a High-Definition Multimedia Interface (HDMI) connector and the device control command is a HDMI Consumer Electronic Control (CEC) command, and wherein the television signal tuner device is configured to receive a low voltage input at a power input source.

In Example 38, the subject matter of one or any combination of Examples 35-37 may optionally include wherein the digital audio video connector is a Mobile High-Definition Link (MHL) connector and the device control command is a MHL Remote Control Protocol (RCP) command, and wherein the television signal tuner device is configured to receive power via the MHL connector.

In Example 39, the subject matter of one or any combination of Examples 35-38 may optionally include wherein the digital terrestrial television signal is an Advanced Television Systems Committee (ATSC) signal.

In Example 40, the subject matter of one or any combination of Examples 35-39 may optionally include wherein the television signal tuner device includes a radio frequency filter.

In Example 41, the subject matter of one or any combination of Examples 35-40 may optionally include further comprising demodulating a digital video stream and a digital audio stream from the digital terrestrial television signal.

In Example 42, the subject matter of one or any combination of Examples 35-41 may optionally include further comprising: receiving a signal from the remote display device, the signal including an identifier of a specified virtual channel, and wherein transcoding the digital bitstream includes transcoding the digital bitstream to digital video and digital audio corresponding to the specified virtual channel.

Example 43 includes the subject matter embodied by a system, comprising: a local display device, the local display device comprising, a display screen to display audio visual content, a digital audio video connector port, and a processor configured to send a device control command via the digital audio video connector port, and a signal tuner device, the signal tuner device comprising: a silicon tuner module configured to receive a digital terrestrial television signal and output a digital bitstream, the digital bitstream including audio visual content in an encoded transport stream, a transcoder module configured to transform the digital bitstream to digital video and digital audio, a transceiver configured to transmit the digital video and digital audio to a remote display device over a wireless connection when the signal tuner device is in a first mode, and a digital audio video connector plug connected to the local display device, the digital audio video connector plug configured to send the digital video and digital audio to the local display device when the signal tuner device is in a second mode, and wherein the signal tuner device is configured to receive the device control command from the local display device.

In Example 44, the subject matter of Example 43 may optionally include wherein in response to receiving the device control command, the signal tuner device is configured to change between the first mode and the second mode.

In Example 45, the subject matter of one or any combination of Examples 43-44 may optionally include further coin a remote display device configured to communicate with the signal tuner device over the wireless connection, the remote display device comprising: a transceiver to receive the digital video and digital audio over the wireless connection, and a display screen to display the digital video and audio.

In Example 46, the subject matte of one or any combination of Examples 43-45 may optionally include wherein the transceiver is further configured to: receive a signal from the remote display device, the signal including an identifier of a specified virtual channel, and wherein to transform the digital bitstream, the transcoder module is configured to transform the digital bitstream to digital video and digital audio corresponding to the specified virtual channel.

In Example 47, the subject matter of one or any combination of Examples 43-46 may optionally include wherein the local display device is further configured to receive a signal from a remote control device, the signal including an identifier of a specified virtual channel and send the identifier of the specified virtual channel to the signal tuner device using another device control command via the digital audio video connector.

In Example 48, the subject matter of one or any combination of Examples 43-47 may optionally include wherein the digital audio video connector plug is a High-Definition Multimedia Interface (HDMI) connector plug and the device control command is a HDMI Consumer Electronics Control (CEC) command, the signal tuner device further comprising a power input source configured to receive a low voltage input for the silicon tuner module.

In Example 49, the subject matter of one or any combination of Examples 43-48 may optionally include wherein the digital audio video connector plug is a Mobile High-Definition Link (MHL) connector plug and the device control command is a MHL Remote Control Protocol (RCP) command, the signal tuner device further configured to receive power for the silicon tuner module via the MHL connector plug.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A television signal tuner device, comprising:
   a tuner included within a housing of the television signal tuner device, the tuner to receive a digital terrestrial television signal;
   a demodulator included within the housing of the television signal tuner device, the demodulator to demodulate the digital terrestrial television signal, wherein the digital terrestrial television signal is demodulated to obtain an encoded Moving Picture Experts Group (MPEG) transport stream of at least one channel;
   a decoder included within the housing of the television signal tuner device, the decoder to decode the encoded MPEG transport stream to decoded digital video and digital audio data, wherein the decoded digital video and digital audio data includes demultiplexed content from a particular channel of the encoded MPEG transport stream;
   a processor included within the housing of the television signal tuner device to:
      control the tuner to filter the digital terrestrial television signal of the particular channel;
      control the demodulator to extract the encoded MPEG transport stream of the particular channel from the digital terrestrial television signal; and
      control the decoder to parse the decoded digital video and digital audio data of the particular channel from the encoded MPEG transport stream;
   a digital audio video connector exposed from the housing of the television signal tuner device, the digital audio video connector to directly couple with an external connector port of a display device, the digital audio video connector to provide the decoded digital video and digital audio data of the particular channel to the display device according to a specification; and
   wherein the television signal tuner device is external to the display device, and wherein the television signal tuner device is removably coupleable to the display device via coupling of the digital audio video connector with the external connector port of the display device.

2. The television signal tuner device of claim 1, wherein the digital audio video connector is a High-Definition Multimedia Interface (HDMI) connector, the television signal tuner device further comprising a power input source to receive a low voltage input for the tuner.

3. The television signal tuner device of claim 1, wherein the digital audio video connector is a Mobile High-Definition Link (MHL) connector, the television signal tuner device further to receive power via the MHL connector.

4. The television signal tuner device of claim 1, further comprising an antenna or an antenna port.

5. The television signal tuner device of claim 1, wherein the tuner is a silicon tuner.

6. The television signal tuner device of claim 1, wherein the television signal tuner device is further to receive a device control command including an identifier of the particular channel, wherein the identifier of the particular channel is used by the tuner to tune the digital terrestrial television signal.

7. The television signal tuner device of claim 1, wherein the digital terrestrial television signal is an Advanced Television Systems Committee (ATSC) signal, and wherein the particular channel corresponds to a virtual channel obtained from a portion of the encoded MPEG transport stream.

8. The television signal tuner device of claim 1, further comprising a voice control component, the voice control component to receive and process a voice command received from a human user to specify the particular channel.

9. The television signal tuner device of claim 1, further comprising a channel selection component, the channel selection component to select the particular channel using an integrated channel map, a list of received channels, or a guide.

10. A television signal tuner device, comprising:
    a tuning component included within a housing of the television signal tuner device, the tuning component including:
       a tuner to receive and demodulate a digital terrestrial television signal;
       a demodulator to generate a digital bitstream from the demodulated digital terrestrial television signal, the digital bitstream including audio visual content of a particular channel, wherein the digital bitstream is a multiplexed Moving Picture Experts Group (MPEG) transport stream; and
       a decoder to transform the audio visual content of the particular channel to decoded digital video and digital audio data;
    a digital audio video connector exposed from the housing of the television signal tuner device, the digital audio video connector to directly couple with an external connector port of a display device, and the digital audio video connector to provide the decoded digital video and digital audio data to the display device according to a specification; and
    a processor included within the Musing of the television signal tuner device, the processor to control the tuner of the tuning component to filter the digital terrestrial television signal, control the demodulator of the tuning component to extract the digital bitstream of the particular channel from the digital terrestrial television signal, and control the decoder of the tuning component to parse the decoded digital video and digital audio data from the bitstream, wherein the decoded digital video and digital audio data provides access to the audio visual content of the particular channel, in response to a device control command received from the display device via the digital audio video connector;

wherein the television signal tuner device is external to the display device, and wherein the television signal tuner device is removably coupleable to the display device via coupling of the digital audio video connector with the external connector port of the display device.

11. The television signal tuner device of claim 10, wherein the digital audio video connector is a High-Definition Multimedia Interface (HDMI) connector and the device control command is a HDMI Consumer Electronics Control (CEC) command, the television signal tuner device further comprising a power input source to receive a low voltage input for the tuning component and the processor.

12. The television signal tuner device of claim 10, wherein the digital audio video connector is a Mobile High-Definition Link (MHL) connector and the device control command is a MHL Remote Control Protocol (RCP) command, the television signal tuner device further to receive power for the tuning component and the processor via the MHL connector.

13. The television signal tuner device of claim 10, further comprising an antenna or an antenna port.

14. The television signal tuner device of claim 10, wherein the digital terrestrial television signal is an Advanced Television Systems Committee (ATSC) signal.

15. The television signal tuner device of claim 10, wherein the tuning component includes a silicon tuner, a demodulator, and a decoder.

16. The television signal tuner device of claim 10, wherein the processor is further to receive the device control command including an identifier of the particular channel, wherein the identifier of the particular channel is used by the television signal tuner device to tune the digital terrestrial television signal.

17. A method of operation for a television signal tuner device, comprising:
receiving and tuning a digital terrestrial television signal using a tuner controlled by a processor included within a housing of the television signal tuner device;
converting, using a demodulator controlled by the processor, the digital terrestrial television signal to a digital bitstream, the digital bitstream including audio visual content of a particular channel, wherein the digital bitstream is a multiplexed Moving Picture Experts Group (MPEG) transport stream;
transforming, using a decoder controlled by the processor, the audio visual content of the particular channel to decoded digital video and digital audio data;
transmitting the decoded digital video and digital audio data to an external connector port of a display device via a digital audio video connector exposed from the television signal tuner device;
receiving, at the processor, a device control command from the display device via the digital audio video connector; and
controlling, using the processor, the tuning of the digital terrestrial television signal in response to receiving the device control command;
wherein the television signal tuner device is external to the display device, and wherein the television signal tuner device is removably coupleable to the display device via direction connection of the digital audio video connector with the external connector port of the display device.

18. The method of claim 17, wherein the digital audio video connector is a High-Definition Multimedia Interface (HDMI) connector and the device control command is a HDMI Consumer Electronics Control (CEC) command, and wherein the television signal tuner device is adapted to receive a low voltage input at a power input source.

19. The method of claim 17, wherein the digital audio video connector is a Mobile High-Definition Link (MHL) connector and the device control command is a MHL Remote Control Protocol (RCP) command, and wherein the television signal tuner device is adapted to receive power via the MHL connector.

20. The method of claim 17, wherein the digital terrestrial television signal is an Advanced Television Systems Committee (ATSC) signal.

21. The method of claim 17, further comprising:
receiving the device control command including an identifier of the particular channel, wherein the identifier of the particular channel is used by the television signal tuner device to tune the digital terrestrial television signal.

22. The method of claim 17, further comprising:
receiving and processing a voice command from a human user to change the particular channel being received and tuned with the television signal tuner device.

* * * * *